July 12, 1927.

G. W. OTTERSON 1,635,338

LOADING DEVICE FOR MOTOR TRUCKS

Filed Feb. 18, 1922   2 Sheets-Sheet 1

Inventor.
George W. Otterson.
by H. J. S. Dennison
Atty.

July 12, 1927.

G. W. OTTERSON 1,635,338

LOADING DEVICE FOR MOTOR TRUCKS

Filed Feb. 18, 1922

Inventor.

George W. Otterson

Patented July 12, 1927.

1,635,338

UNITED STATES PATENT OFFICE.

GEORGE W. OTTERSON, OF TORONTO, ONTARIO, CANADA, ASSIGNOR, BY DIRECT AND MESNE ASSIGNMENTS, OF FOUR-FIFTHS TO LISSA A. OTTERSON, OF SEATTLE, WASHINGTON, AND ONE-FIFTH TO JOSEPH F. BRANDENBURG, OF NEW YORK, N. Y.

LOADING DEVICE FOR MOTOR TRUCKS.

Application filed February 18, 1922. Serial No. 537,649.

The object of the invention is to provide a motor truck machine having a very simple, efficient and conveniently controlled power-operated loading and unloading apparatus. The invention will now be described with reference to a preferred embodiment and will be more particularly pointed out in the appended claims.

In the drawings, Figure 1 is an elevational view of a motor truck equipped with my device.

Figure 1:
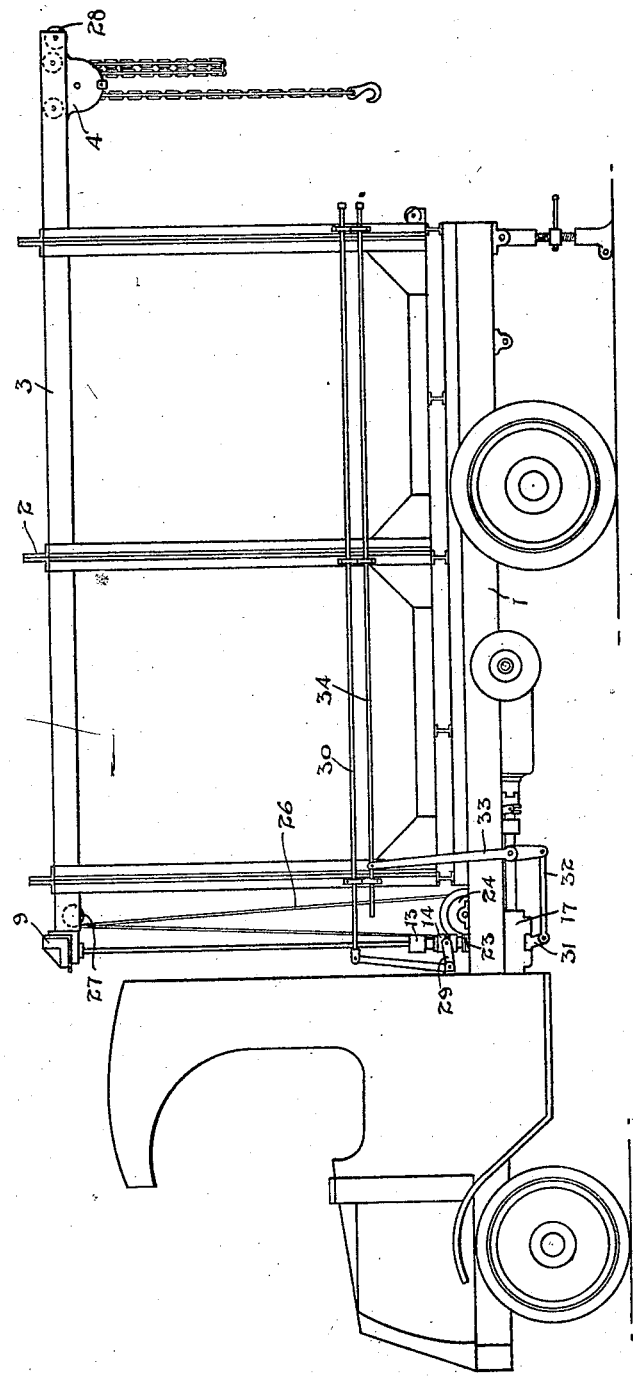

In carrying this invention into effect the truck body 1 is provided with rigid frames 2 which extend across and above the body and supported centrally of these frames is a longitudinal trackway 3. This trackway is formed of a pair of channel bars arranged with the flanges turned inwardly and supported on the bottom flanges is a trolley 4 which carries the hoisting gear. This gear may be of any standard construction and is not specifically shown other than that it is driven by a self-locking worm-gearing comprising a worm wheel 5 which meshes with a worm 6.

The worm 6 constituting the driving element of this gearing is slidably mounted on a squared shaft 7 which extends from end to end of the trackway, passing through and being supported in suitable bearings 8 in the trolley frame.

At the forward end the squared shaft 7 is supported and held against longitudinal movement by a bearing in an angle bracket casing 9 and has secured thereto a bevelled pinion 10. A suitable support, not shown, may be provided for the rear end of the shaft.

A vertical shaft 11 is journalled in the casing 9 and has secured at its upper end a pinion 12 meshing with the pinion 10. This shaft extends downwardly and is divided toward the lower end, the members being connected by a coupling sleeve 13 which is secured to the upper member and has a clutch face at the lower end adapted to be engaged by a slidable clutch collar 14. This clutch collar is mounted to slide on and rotate with the lower member 15 of the shaft which is supported in bearings 16 in a casing 17 and at its lower end is provided with a bevelled pinion 18.

A horizontal shaft 19 suitably coupled and driven from the engine of the truck is mounted in bearings in the casing 17 and freely rotatable on journals inside the casing 17 and axial with the shaft 19 are bevel gear wheels 20 and 21 of a reversing gearing, which are constantly in mesh with the bevel pinion 18.

A clutch sleeve or reversing member 22 slidably keyed to the shaft 19 operates either one or other of the bevelled wheels 20 or 21 which thus imparts motion in either one direction or the other to the vertical shaft.

A worm 23 is free on the vertical shaft member 15 above the casing 17 and this is provided with a clutch surface to be engaged by the clutch collar 14.

The worm 23 meshes with a worm wheel 24 which drives a drum 25. Around the drum 25 is wound a cable 26, both courses of which extend upwardly over the pulleys 27 arranged at the end of the overhead structure. One course of the cable passes directly and is fastened to the trolley 4, and the other course extends around a pulley 28 at the rear end of the fixed frame and thence forwardly and is connected to the trolley. The cable is thus, in effect, an endless operating member.

Figures 2, 3:
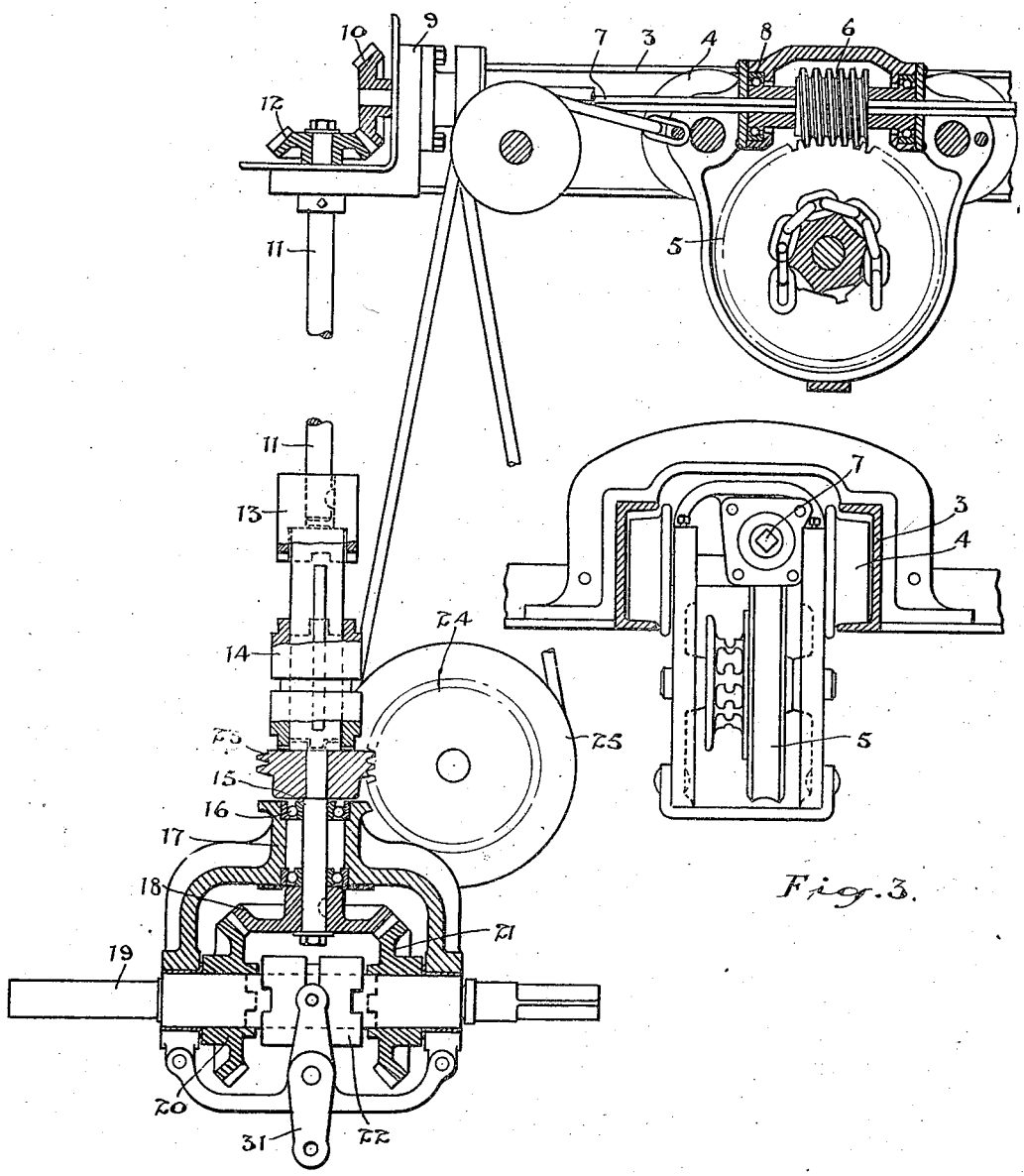
Figure 2 is a sectional detail of the trolley hoist driving and trolley travelling mechanism.
Figure 3 is an enlarged end elevational view of the supporting trackway showing the trolley carried thereon.

It will thus be seen that by shifting the clutch sleeve 22 into one extreme position or the other, the clutch 14 being in the position shown in Fig. 2, the trolley may be caused to travel inwardly or outwardly and its movement will be arrested by moving either of the clutch sleeves to neutral; likewise the hoisting mechanism can be operated for raising or lowering, when the clutch sleeve 14 is in engagement with the clutch member 13. When the operation of the hoisting mechanism is stopped by throwing either of the clutches to neutral, the load will be sustained by reason of the self-locking worm gearing 5, 6.

The vertical operating clutch sleeve is operated by a bell crank lever 29 to the upper end of which is connected a rod 30. This rod extends longitudinally of the truck frame from the front to the back end being supported in slidable bearings. The clutch sleeve 14 in connection with the cooperative clutch elements on the coupling sleeve 13 and the worm 23 constitutes a selective clutch for connecting either the square shaft 7 or the cable 26 with the reversing gear in the casing 17 connected to be driven from the power plant of the vehicle.

A short lever 31 pivotally mounted in the bottom of the casing 17 operates the clutch sleeve 22. This is operated by a link 32 and lever 33.

A rod 34 is connected to the upper end of the lever 33 and is supported parallel with the rod 30 and also extends from the front to the back end of the truck. The arrangement of these rods for operating the levers enables the person transferring the load to control the movement of the lifting and carrying mechanism from any point alongside the truck or on it or from the rear thereof.

A construction such as described is extremely simple and easily operated. The overhead trackway carrying the trolley extends beyond the rear end of the truck frame and by manipulating the controls the trolley may be carried back to the farthest end. If a heavy weight is to be lifted the control mechanism is operated to rotate the squared shaft 7 thereby operating the worm 6 and worm wheel 5 to raise the load. When the load has been raised the desired height, the clutch sleeve 14 is withdrawn from the member 13 and by manipulating this clutch to operate the worm drive of the cable drum and properly positioning the clutch 22 the trolley is moved forward carrying the load with it and it may be stopped at any point in the length thereof and by changing the drive to the hoisting mechanism in the reverse direction to that in which it was operated previously the load may be readily deposited at a precise spot on the floor of the vehicle.

With a device such as described it will be readily understood that a truck may be loaded expeditiously with heavy merchandise and without strain or danger to the operator.

What I claim as my invention is:—

1. A machine of the character described comprising a road vehicle having an overhead frame on its body with a track on said frame extending lengthwise of the body, a trolley movable along said track, a longitudinal rotary shaft carried by the frame, means for driving said longitudinal shaft in either direction, and a hoist and means for operating the same carried by said trolley, said means on the trolley having a member in slidable driving connection with said shaft and comprising a lock of self-holding meshing gears through which the hoist is operated from said shaft to raise and lower the load and whereby to hold the load at any height or point lengthwise of the vehicle body.

2. A machine of the character described comprising a road vehicle having an overhead frame on its body with a track on said frame extending lengthwise of the body, a trolley movable along said track, a longitudinal rotary shaft carried by the frame, a source of power, means for causing said longitudinal shaft to be driven in either direction from said source and for stopping the application of power to said shaft, separate means whereby the trolley is traversed in either direction from said source of power, and a hoist and means for operating the same carried by said trolley, said means on the trolley having a member in slidable driving connection with said shaft and comprising a lock of self-holding meshing gears through which the hoist is operated from said shaft to raise and lower the load, and whereby to hold the load at any height or point lengthwise of the vehicle body.

3. A machine of the character described comprising in combination with a motor truck, an overhead frame thereon, and a track extending lengthwise on said frame, a trolley movable along said track, a rotary shaft carried longitudinally by said overhead frame, power means for driving said shaft, a self-holding worm gearing carried by the trolley, said shaft passing in driving relation through the worm of said gearing and the worm being slidable along the shaft, and a hoisting gear on the trolley to be driven by said shaft and worm gearing at any point.

4. A machine of the character described comprising in combination with a motor truck, an overhead frame thereon, and a track extending lengthwise on said frame, a trolley movable along said track, a rotary shaft carried longitudinally by said overhead frame, power means for driving said shaft, a self-holding worm gearing carried by the trolley, said shaft passing in driving relation through the worm of said gearing and the worm being slidable along the shaft, a hoisting gear on the trolley to be driven by said shaft and worm gearing at any point, and cable means guided about the front and rear ends of the frame for traversing said trolley.

5. A machine of the character described comprising in combination with a motor truck, an overhead frame thereon, and a track extending lengthwise on said frame, a trolley movable along said track, a rotary shaft carried longitudinally by said overhead frame, a self-holding gearing carried by the trolley, said shaft passing in driving relation through a member of said gearing and said member being slidable along the shaft, a hoisting gear on the trolley to be driven by said shaft and gearing at any point, and driving gearing in operative relation to the power mechanism of the truck extending upward at the front of the frame to driving connection with the forward end of said shaft.

6. A machine of the character described comprising in combination with a motor truck, an overhead frame thereon, and a track extending lengthwise on said frame, a trolley movable along said track, a rotary shaft carried longitudinally by said overhead frame, a self-holding worm gearing carried by the trolley, said shaft passing in driving relation through the worm of said gearing and the worm being slidable along the shaft, a hoisting gear on the trolley to be driven by said shaft and worm gearing at any point, and mechanism including a reversing device for driving said shaft in either direction from the power plant of the vehicle.

7. A machine of the character described comprising in combination with a motor truck, an overhead frame thereon, and a track extending lengthwise on said frame, a trolley movable along said track, a rotary shaft carried longitudinally by said overhead frame, a self-holding gearing carried by the trolley, said shaft passing in driving relation through a member of said gearing and said member being slidable along the shaft, a hoisting gear on the trolley to be driven by said shaft and gearing at any point, cable means for traversing the trolley, a reversing gearing adapted to be operated from the power plant of the vehicle, and clutch means adapted to connect either the longitudinal shaft or the cable means with said reversing gearing so that either may be driven in either direction.

8. A machine of the character described comprising in combination with a motor truck, an overhead frame thereon, and a track extending lengthwise on said frame, a trolley movable along said track, a rotary shaft carried longitudinally by said overhead frame, a self-holding gearing carried by the trolley, said shaft passing in driving relation through a member of said gearing and said member being slidable along the shaft, a hoisting gear on the trolley to be driven by said shaft and gearing at any point, driving gearing in operative relation to the power mechanism of the truck extending upward at the front of the frame to driving connection with the forward end of said shaft, cable means also driven toward the front of the frame for operating the trolley, and control members for the shaft-driving gearing and the cable means extending longitudinally to the rear end of the frame.

GEORGE W. OTTERSON.